United States Patent
Angilivelil et al.

(10) Patent No.: US 9,286,668 B1
(45) Date of Patent: Mar. 15, 2016

(54) GENERATING A PANEL VIEW FOR COMICS

(75) Inventors: Aby Thomas Angilivelil, Issaquah, WA (US); Palanidaran Chidambaram, Tamil Nadu (IN); Surendran Rangasamy, Tamil Nadu (IN); Nadia C. Payet, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 465 days.

(21) Appl. No.: 13/526,310

(22) Filed: Jun. 18, 2012

(51) Int. Cl.
*G06T 7/00* (2006.01)

(52) U.S. Cl.
CPC .......................................... *G06T 7/00* (2013.01)

(58) Field of Classification Search
None
See application file for complete search history.

(56) References Cited

U.S. PATENT DOCUMENTS

| | | | | |
|---|---|---|---|---|
| 5,848,184 A | * | 12/1998 | Taylor et al. | 382/173 |
| 6,738,154 B1 | * | 5/2004 | Venable | 358/1.15 |
| 8,059,892 B1 | * | 11/2011 | Fan | 382/167 |
| 8,098,936 B2 | * | 1/2012 | Guerzhoy et al. | 382/181 |
| 8,383,207 B2 | * | 2/2013 | Falbaum et al. | 427/427.2 |
| 2006/0288278 A1 | * | 12/2006 | Kobayashi | 715/523 |
| 2006/0288279 A1 | * | 12/2006 | Yacoub et al. | 715/530 |
| 2008/0077857 A1 | * | 3/2008 | Olson | 715/246 |
| 2008/0199076 A1 | * | 8/2008 | Matsuoka et al. | 382/176 |
| 2010/0315315 A1 | * | 12/2010 | Osborne | 345/1.3 |
| 2011/0102823 A1 | * | 5/2011 | Onogi | 358/1.9 |
| 2012/0017144 A1 | * | 1/2012 | Nonaka | 715/243 |
| 2012/0251001 A1 | * | 10/2012 | Hsu | 382/173 |
| 2012/0314942 A1 | * | 12/2012 | Williams et al. | 382/164 |

FOREIGN PATENT DOCUMENTS

WO   WO 2007091081 A2 *  8/2007

OTHER PUBLICATIONS

Ngo ho, et al., "Comics page structure analysis based on automatic panel extraction". GREC 2011, Ninth IAPR International Workshop on Graphics Recognition, Sep. 2011, pp. 1-4.

* cited by examiner

*Primary Examiner* — Stephen Hong
*Assistant Examiner* — Sanchita Roy
(74) *Attorney, Agent, or Firm* — Lowenstein Sandler LLP

(57) ABSTRACT

A panel view module receives a comic comprising one or more pages, which comprise one or more panels. The panel view module may identify candidate comic panels and determine confidence levels for the candidate comic panels. The panel view may also generate a panel view for the comic based on the confidence levels for the candidate comic panels.

28 Claims, 10 Drawing Sheets

GENERATING A PANEL VIEW FOR COMICS

BACKGROUND OF THE INVENTION

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications or media items. Among these electronic devices are electronic book readers, cellular telephones, personal digital assistants (PDAs), portable media players, tablet computers, electronic pads, netbooks, desktop computers, notebook computers, and the like.

Comics are a popular type of media item or publication which may be viewed or consumed using these electronic devices. Comics are generally narrative artwork (e.g., artwork or pictures which contain text or narrative) which use multiple panels (e.g., comic panels) to portray scenes, events, storylines, etc. Each page of a comic may include one or more panels (e.g., enclosed regions). The panels may have various shapes (e.g., geometric shapes or irregular shapes) and each page may have a different layout of panels (e.g., each page may have a different number of panels arranged in different ways). The panels often include pictures or images, and may also include text accompanying the pictures or images. Comics often include dialog which are generally included in word balloons, as well as brief descriptive prose. The panels of a comic may be read in a specific order (e.g., from top to bottom and left to right) and may illustrate or narrate one or more storylines. A comic may generally refer to any medium which uses panels having one or more of text and images, to convey information such as a storyline. Comics may include many different styles and genres including, but not limited to, comic books, comic strips, manga (e.g., Japanese style comics), manhwa (e.g., Korean style comics), web comics (e.g., online comics or comics published on the internet), graphic novels, etc. Comics may be presented on electronic devices in the form of digital images (e.g., Joint Photographic Experts Group (JPEG) images, bitmaps (BMPs), Portable Network Graphics (PNG) images, Graphics Interchange Format (GIF) images, etc.), or in other formats such as the Portable Document Format (PDF) and the Hypertext Markup Language (HTML) format, etc. Traditionally, users may browse or navigate through a comic on a page by page basis.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

It should be understood that although the detailed description given below and the accompanying drawings use the term "comic" or "comics," other embodiments may be applied to general publications (e.g., books, magazines, newspapers, etc.) or other types of written, printed, or illustrated works. For example, the embodiments described herein may be applied to a general publication such as a book, a magazine, a newspaper, a textbook, or a children's book which may include pages with panels (e.g., enclosed regions which have text and images).

DETAILED DESCRIPTION OF THE PRESENT INVENTION

Figure 1:
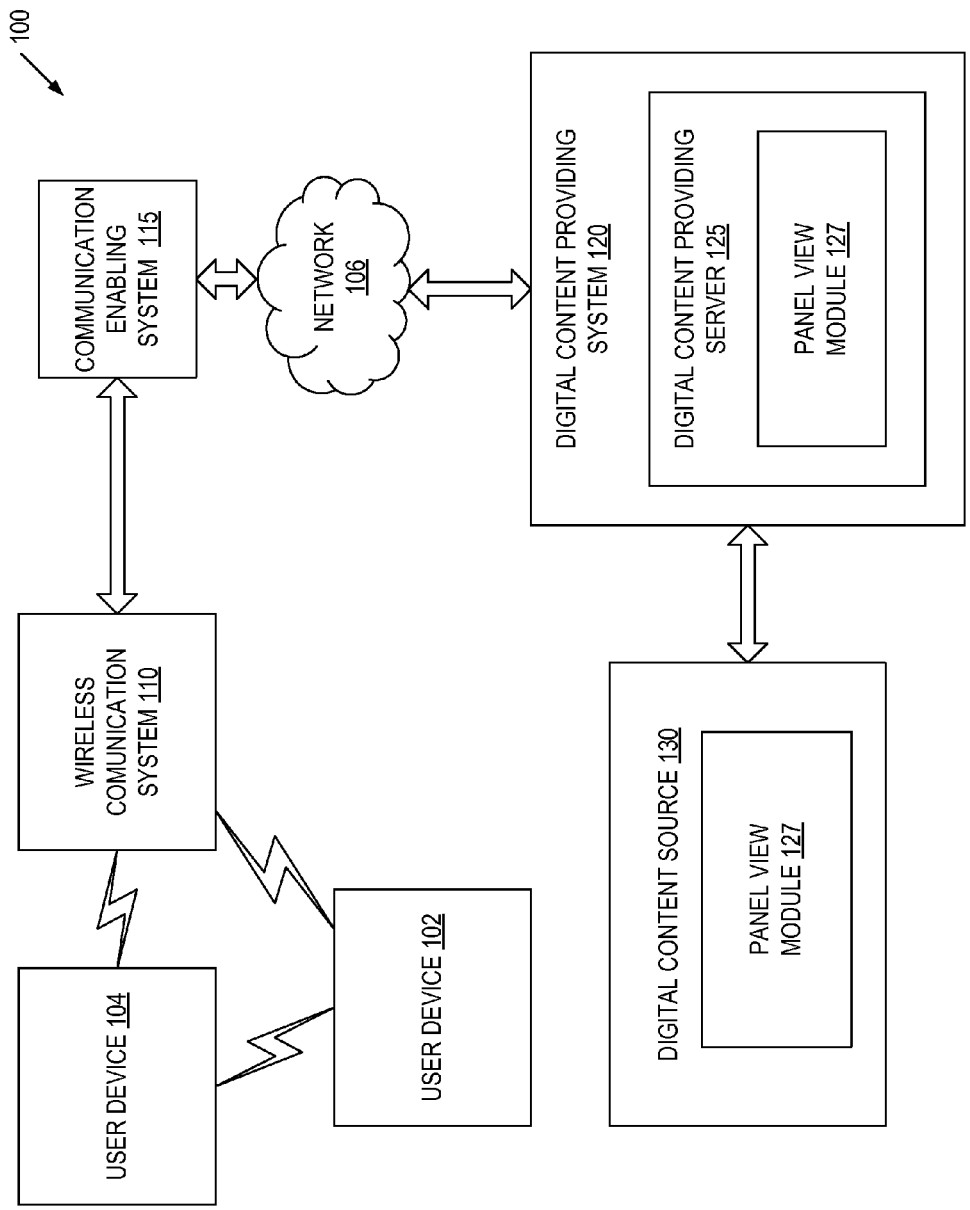
FIG. 1 is a block diagram of an exemplary network architecture, in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for a panel view module that can generate a panel view for a comic. A panel view may be a guide, a navigation menu, or a navigation mechanism which allows a user to navigate or browse a comic panel by panel, instead of page by page. The panel view may also allow a user to select and view individual panels of a comic. The panel view module may obtain the background color for one or more pages of the comic. In one embodiment, the panel view module may receive user input indicating the background color from a user (e.g., the color "white" or a numerical value such as 0 or 10). In another embodiment, the panel view module may analyze one or more pixels in one or more pages of the comics to determine the background color. For example, the panel view module may determine the background colors for multiple pages and average the background colors together, or the panel view module may determine the background colors for multiple pages and may compare the different background colors for each of the different pages to determine a preferred background color. The panel view module may grow or identify a background region, using the determined background color.

The panel view module may also identify candidate comic panels, based on the background region.

In one embodiment, the panel view module may determine a confidence level (e.g., a numerical value or other value indicating the likelihood that a candidate comic panel is an actual panel in the comic). Based on the confidence levels for the candidate comic panels, the panel view module may identify a first set of candidate comic panels and add or include the first set of candidate comic panels in the panel view for the comic. Each candidate comic panel in the first set of candidate comic panels may have a confidence value greater than or equal to a threshold value. The panel view module may also identify a second set of candidate comic panels and may receive user input for the second set of candidate comic panels. The user input may indicate a subset of the second set of candidate comic panels to add or include in the panel view for the comic. In one embodiment, the panel view module may also identify candidate comic panels based on previous user input. For example, the panel view module may receive user input for other pages of the comic or from other pages in other previously processed or analyzed comics, identifying candidate comic panels. User input correcting or creating panel views for previously processed comics may be stored and used to identify candidate comic panels. User input correcting or creating the current panel view for a current comic (e.g., the comic currently being analyzed) may also be stored and used to identify candidate comic panels. The panel view module may store this user input and may use this user input to identify candidate comic panels in a page. In another embodiment, the panel view module may use one or more comic panels in the panel view to generate a table of contents for the comic.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, comics etc. The media items may also include digital video (e.g., movies, television, short clips, etc.), images (e.g., art, photographs, etc.), audio files, and multimedia content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books) to users upon the users' purchase of the items. In this role, the digital content providing server 125 may essentially act as a bookseller or the like. In other cases, the digital content providing server 125 corresponds to an entity which provides electronic media items (e.g., comics) to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic media items (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, BLUETOOTH® or other wireless communication protocols.

In one embodiment, digital content providing server 125 may include panel view module 127. The panel view module 127 may receive one or more pages of a comic (e.g., receive one or more pages of a comic book or manga). The panel view module 127 may obtain the background color of one or more pages of the comic. In one embodiment, the panel view module 127 may receive a user input indicating the background color of one or more pages of the comic. For example, the panel view module 127 may receive a Red Green Blue (RGB) value (e.g., the value [233, 56, 22]) which indicates the red, blue, and green components of the background color. In another example, the panel view module may receive a string value (e.g., "white") or some other value (e.g., the number 255) indicating the background color. In another embodiment, the panel view module 127 may analyze one or more pixels of the one or more pages to determine the background color. For example, the panel view module 127 may obtain the color of all the pixels within a region (e.g., within a thin band) on the sides (e.g., top, bottom, left, right) of a page of the comic. The panel view module 127 may determine the average color (e.g., an average RGB value or an average color value) of all the pixels within the region and may use the average color as the background color. For example, the panel view module may average the colors of pixels within a band (e.g., a 5-pixel wide band) on one or more sides of the page (e.g., the top, bottom, left or right side).

In one embodiment, after obtaining the background color, the panel view module 127 may grow the background region (e.g., the region or portion of the page which is part of the background of the comic) using the background color, starting from a region or a pixel in the page. For example, the panel view module 127 may analyze one or more pixels in the page of the comic starting from the top-most and left-most pixel in the page of the comic. If a pixel has a color within a threshold value of the background color, the pixel is marked or identified as part of the background region. In another example, if a first pixel is identified as part of the background region, and a second pixel near or adjacent to the first pixel is within has a color value within a threshold value of the first pixel, the second pixel may be marked or identified as part of the background region. The panel view module 127 may analyze pixels starting along the sides or edges of the comics and may grow or identify the background region (e.g., analyze pixels and identify whether they are part of the background region) towards the center of the page. By analyzing the pixels in the page (starting at a specific pixel or region) and identifying each adjacent pixel as part of the background region or not part of the background region, the panel view module 127 identifies the background region or grows the background region starting from a region or pixel on the page.

In another embodiment, after identifying the background region, the panel view module 127 may identify one or more candidate comic panels on the page based on the identified background region. The regions of the page which have not been identified as part of the background region are likely to be the comic panels for the comic (e.g., the regions of the page, which are not identified as part of the background region, are candidate comic panels). The panel module 127 may analyze the regions of the page which are not part of the background region and identify boundaries (e.g., an outline) for the regions (e.g., a square shaped boundary, a circle shape boundary, or some other shaped boundary).

In one embodiment, the panel view module 127 may use morphology (e.g., mathematical morphology or binary morphology) to analyze the regions (and their boundaries to) identify candidate comic panels. For example, after identifying the background region, the panel view module 127 may perform a number of morphological erosions on the regions which are not identified as part of the background region. The morphological erosions may shrink the size of the regions which may break any regions which are linked together, into separate regions. After performing the morphological erosions the panel view module may perform a number of morphological dilations on the regions. The morphological dilations may increase the size of the regions. In one embodiment, the number of morphological erosions performed may be equal to the number of morphological dilations performed. In another embodiment, the number of morphological erosions performed may be different than the number of morphological dilations performed. After performing the morphological erosions and morphological dilations, the panel viewing module 127 may identify the candidate comic panels by identifying the boundaries (e.g., the outer edges or a bounding box) around the regions which were eroded and dilated.

In one embodiment, the panel view module 127 may analyze regions which are enclosed within each other. For example, a first region may be completely enclosed within a second region. The panel view module 127 may not identify the enclosed region (e.g., the first region) as a separate candidate comic panel because the region is completely enclosed within a larger region. In another embodiment, the panel view module 127 may analyze regions which overlap each other, but are not enclosed within one another. For example, a lower right portion of first square shaped region may overlap with a top left portion of a second rectangular shaped region. The panel view module 127 may identify both the overlapping regions as one single candidate comic panel. The panel view module 127 may determine whether regions (which are not identified as part of the background region) of the page are enclosed by one another or overlap, by analyze the locations of the boundaries of the regions (e.g., by analyzing the X-Y coordinates of the boundaries of the regions).

In one embodiment, after identifying one or more candidate comic panels, the panel view module 127 may determine a confidence level for each of the candidate comic panels. A confidence level may be a value which indicates the likelihood that the candidate comic panel is an actual panel in the page of the comic. For example, a confidence level for a candidate comic panel may be the value "90" indicating that there is a 90% chance that the candidate comic panel is an actual panel. In another example, the confidence level may merely be numerical value (e.g., 83), with a higher numerical value indicating a higher likelihood that the candidate comic panel is an actual panel. The panel view module 127 may determine the confidence level for a candidate comic panel using a variety of criteria. For example, the confidence level for a candidate comic panel may be calculated based on whether the candidate comic panel has a pre-determined shape (e.g., is a square shape, a rectangular shape, has an "L" shape, has a geometric shape, etc.). In another example, the confidence level for a candidate comic panel may be calculated based on whether one or more edges of the candidate comic panel are parallel to an edge of the page of the comic. In a further example, the confidence levels for candidate comic panels may be calculated based on whether a layout of the candidate comic panels matches a pre-defined layout (e.g., matches a known layout for comic panels). In yet another example, the confidence levels for the candidate comic panels may be calculated based on the sizes of the candidate comic panels (e.g., the confidence level may be higher if a candidate comic panel is at least $1/64^{th}$ of the size of the page).

In one embodiment, the panel view module 127 may identify a first set of candidate comic panels which have a confidence level greater than or equal to a threshold, and may add the first set of candidate comic panels to the panel view. The panel view module 127 may also identify a second set of candidate comic panels which have a confidence levels below the threshold and may present the second set of candidate comic panels to a user (e.g., display the second set of candidate comic panels to a user). The panel view module 127 may receive user input identifying a subset of the second set of candidate comic panels and may add the subset of the second set of candidate comic panels, to the panel view.

In one embodiment, the panel view module 127 may store or process the user input and may identify candidate comic panels, based on the user input. For example, a user input may indicate that a candidate comic panel having a particular shape (e.g., an irregular shape) is an actual comic panel. The panel view module 127 may store the particular shape and may identify future candidate comic panels based on the stored shape. The panel view module 127 may store and process a variety of user input pertaining to the size, shape, location, position, and layout of comic panels and may use the user input when identifying candidate comic panels at a later time. The user input may be received for one or more pages of the current comic that the panel view module 127 is processing or from one or more pages of comics that the panel view module 127 has previously processed. Analyzing the user input may allow the panel view module 127 to "learn" how to better identify candidate comic panels.

In one embodiment, the panel view module 127 may use the panel view (e.g., may use the panels included in the panel view) to generate a table of contents (TOC) for the comic. The panel view module 127 may identify one or more comic panels in the panel view based on one or more of the size, shape, and other characteristics (e.g., color, placement or position, etc.) of the panels and may generate a TOC using the identified comic panels. For example, the panel view module 127 may identify comic panels in the panel view which are greater than or equal to a size threshold, and may include those identified comic panels in the table of contents. In another example, the panel view module 127 may identify comic panels which are on the top left corner of the pages of the comic (e.g., for each page, identify the comic panel which is on the top-most and left-most comic panel) may include those identified comic panels in the table of contents.

In one embodiment, the panel view module 127 may generate a panel view for electronic media items (e.g., for comics) currently offered to users by digital content providing server 125 or for newly received electronic media items from digital content source 130 before they are provided to a user. Digital content source 130 may be, for example, a publisher, author, creator, etc. of electronic media items or other digital content that provides the digital content to be distributed by digital content providing system 120. Digital content source 130 may also be a server or other computing system for the publisher, author, creator, etc. of electronic media items or other digital content. In one embodiment, the digital content source 130 may include the panel view module. The digital content source 130 (e.g., the author, publisher, server, etc.) may generate a panel view for a comic prior to providing the comic (along with the panel view) to the digital content providing system 120. Panel view module 127 is described in greater detail below with reference to FIGS. 2-8.

Figure 2:
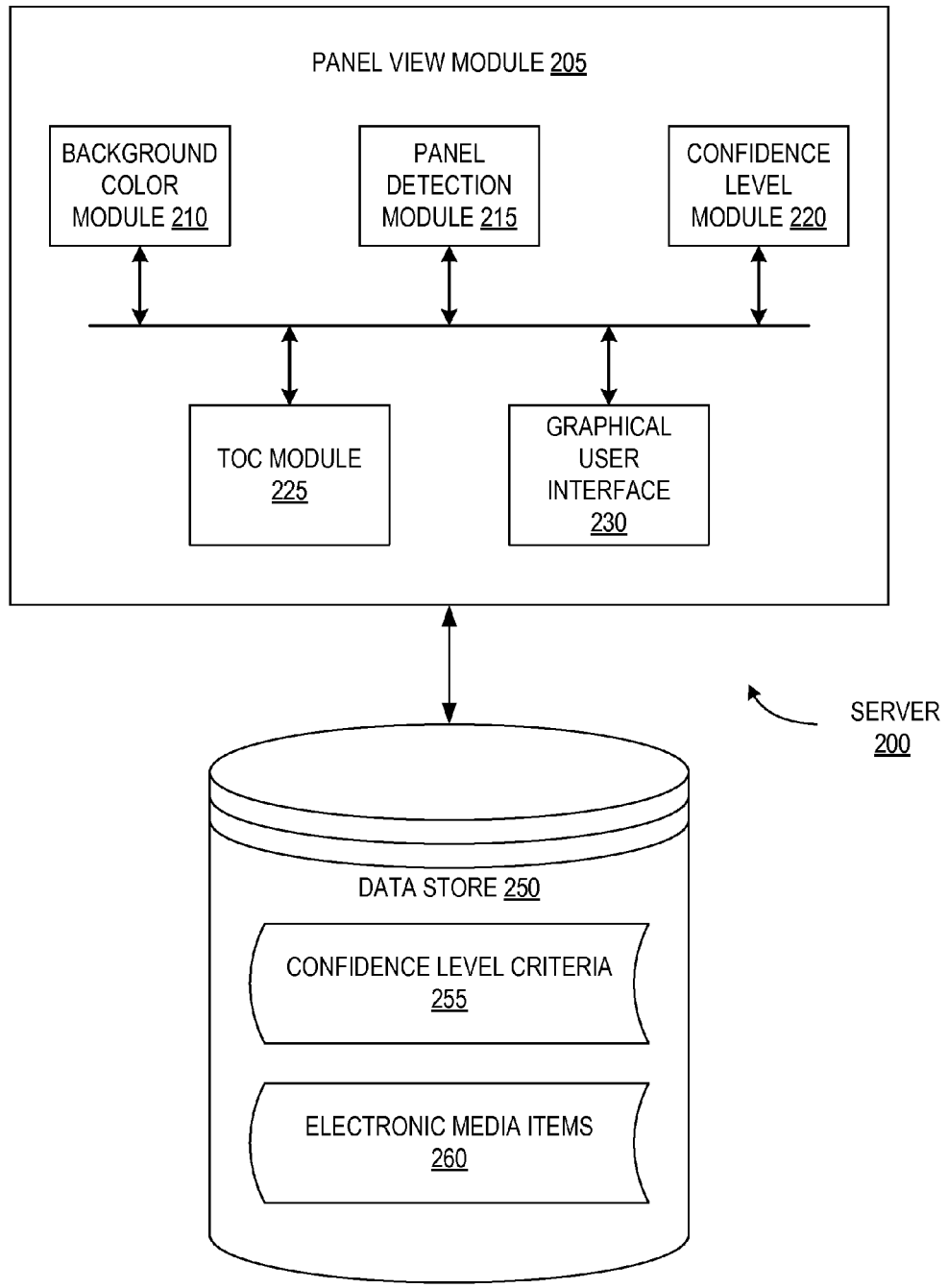
FIG. 2 is a block diagram illustrating a panel view module, according to an embodiment.

FIG. 2 is a block diagram of one embodiment of a panel view module 205 that may be included in a server 200 (e.g., digital content providing server 125 of FIG. 1). In one embodiment, server 200 includes panel view module 205, which may include a background color module 210, a panel detection module 215, a confidence level module 220, a TOC module 225, and a graphical user interface (GUI) 230. In one embodiment, panel view module 205 is connected to a data store 250, which may be a file system, database or other data management layer resident on a data storage device such as a disk drive, RAM, ROM, database, etc. Data store 250 may include confidence level criteria 255 and electronic media items 260 (e.g., comics). In another embodiment, the panel view module 205 may generate a panel view for the one or more electronic media items 256 (e.g., the one or more comics) stored in the data store 250.

In one embodiment, the confidence level criteria 255 may include rules or criteria for calculating or determining a confidence level of a candidate comic panel. For example, the confidence level criteria 255 may include a set of possible shapes (e.g., geometric shapes, polygons, etc.) for comic panels and may include a rule indicating that the confidence level of a candidate comic panel should be increased if the shape of the candidate comic panel matches one of the of the possible shapes. In another example, the confidence level criteria 255 may include a rule indicating that the confidence level for a candidate comic panel should be increased if an edge of the candidate comic panel is parallel to one or more edges of the comic (e.g., if a left edge of a candidate comic panel is parallel to a left edge of the comic). In a further example, the confidence level criteria 255 may include pre-defined or known layouts for pages of a comic and may include a rule indicating that the confidence levels for a plurality of candidate comic panels should be increased if the plurality of candidate comic panels has a layout which matches a pre-defined layout or other known layouts. For example, a pre-defined or known layout for comic panels may include three comic panels which are positioned along the upper edge of a page, such that the three comic panels are of equal size and are equidistant from each other. If three candidate comic panels match the layout of the pre-defined or known layout (e.g., the three candidate comic panels are also positioned along the upper edge of a page, are also of equal size, and are also equidistant from each other), then the confidence levels of the three candidate comic panels may be increased. In other embodiments a variety or arrangements, shapes, and sizes of comic panels on a page may be used in pre-defined or known layouts. In yet another example, the confidence level criteria 255 may include user input (which may be previously received or stored) for pages of the current comic or pages from previous comics, identifying shapes, sizes, positions, or layouts of candidate comic panels.

In one embodiment, the background color module 210 may obtain a background color for one or more pages of a comic. For example, the background color module 210 may receive user input (received via an input device such as a keyboard, mouse, stylus, touch screen, etc.) indicating the background color for one or more pages of a comic (e.g., an RGB value or a single color value). In another example, the background color module 210 may select a portion of one or more pages of the comic (e.g., may select an upper portion or a corner portion of page) and may analyze the pixels within the selected portion. The background color module 210 may obtain the average value of the color of the pixels in the selected portion (e.g., the average RGB value or the average color value) to determine the background color. In another embodiment, the background color module 210 may use multiple regions across multiple pages of a comic to obtain a more accurate background color (i.e., because the background color for a comic may generally be the same across multiple pages of the comic).

In one embodiment, the panel detection module 215 may grow the background region of a page of the comic. For example, the panel detection module 215 may start at a pixel along the edge or corner of the page of the comic and start analyzing pixels towards the center of the page. As each pixel is analyzed, the panel detection module 215 may identify the pixel as part of the background region if the color of the pixel is within a threshold of the background color. For example, if the background color is the RGB value [234, 212, 50], and the threshold value is 3 for each of the RGB components, then a pixel may be identified as part of the background region if it is has an RGB value of [237, 211, 53] (e.g., if each of the RGB components in the pixel color is within 3 of the corresponding RGB component in the background color). In another example, the background color may be a single color value (e.g., 200) and the threshold value may be 6. A pixel may be identified as part of the background region if the color value of the pixel is within 6 of the background color value (e.g., if the color value is between 194 and 206). In other embodiments, different types of thresholds or different threshold values may be used to identify pixels as part of the background region.

In another embodiment, the panel detection module 215 may identify one or more candidate comic panels after identifying or growing the background region of the page. For example, pixels which are not identified as part of the background region are likely to be comic panels. The panel detection module 215 may use morphology methods, techniques and algorithms to identify candidate comic panels from the pixels which were not identified as part of the background region of the page.

In one embodiment, the confidence level module 220 may determine a confidence level for each candidate comic panel identified by the panel detection module 215. The confidence level module 220 may use the confidence level criteria 255 to determine or calculate the confidence levels of the candidate comic panels. For example, the confidence level module 220 may determine a confidence level for a candidate comic panel based on whether the shape of the candidate comic panel matches a pre-defined shape. In another example, the confidence level module 220 may determine a confidence level for a candidate comic panel based on whether an edge of the candidate comic panel is parallel to one or more edges of the page.

In another embodiment, the confidence level module 220 may also select a first set of candidate comic panels which have confidence levels greater than or equal to a threshold (e.g., greater than or equal to 85%, or greater than or equal to the value 65). The confidence level module 220 may also include the first set of candidate comic panels in the panel view. The confidence level module 220 may also provide or display a second set of candidate comic panels to a user via the GUI 230. The confidence level module 220 may receive user input selecting or identifying a subset of the candidate comic panels and may add the subset of the candidate comic panels or may add new candidate comic panels to the panel view.

In one embodiment, the GUI 230 may provide or display one or more pages of the comic to a user. The GUI 230 may also display the candidate comic panels to the user and may also display an indication of the confidence level for the candidate comic panels. For example, the GUI 230 may outline candidate comic panels with confidence above a certain threshold with dashed lines and the GUI 230 may outline candidate comic panels with confidence levels below the certain threshold with dotted lines. In another example, the GUI 230 may display a number or other text indicating the confidence level for candidate comic panels (e.g., may display the number 88 in the corner of the candidate comic panel).

In another embodiment, the GUI 230 may also receive user input from the user (e.g., via one or more of a mouse, a keyboard, a touch screen, a touch pad, a stylus, etc.). The user input may indicate whether the candidate comic panels are actual comic panels. For example, the panel detection module 215 may identify a candidate comic panel, but the candidate comic panel may not be an actual comic panel (e.g., the panel detection module 215 incorrectly identified a candidate comic panel). The user may provide user input to correctly identify a comic panel (e.g., may draw an outline for the actual comic panel, may move or modify one or more of the edges for the candidate comic panel, may delete a candidate comic panel, etc.). The user may also provide user input identifying one or more of the candidate comic panels as actual candidate panels. The GUI 230 may provide the user input to the confidence level module 220 which may add a subset of the second set of candidate comic panels to the panel view. The confidence level module 220 may also add the new candidate panels (e.g., candidate comic panels which were modified by the user or new candidate comic panels identified by the user) to the panel view, based on the user input received by the GUI 230.

Figure 3:
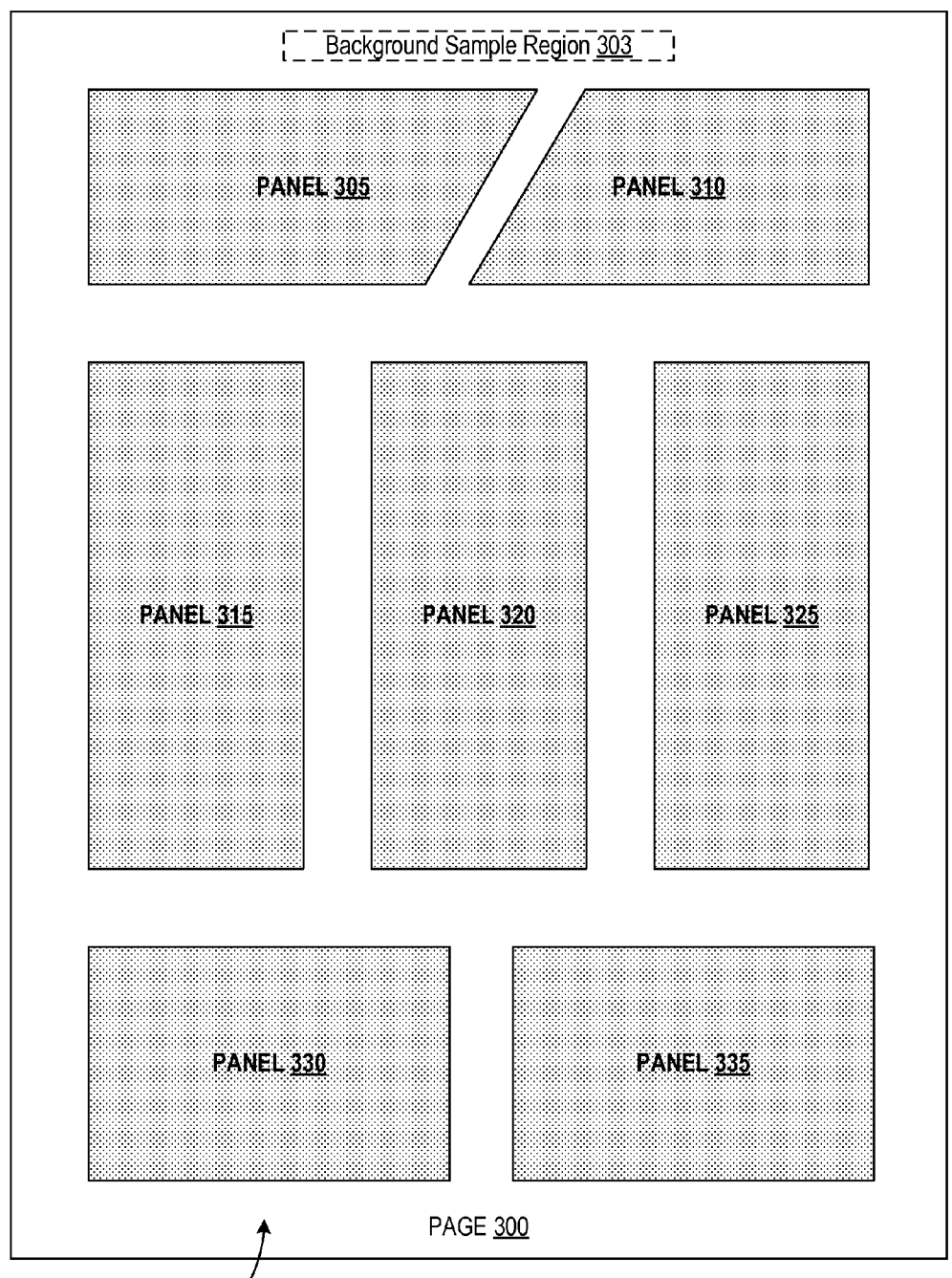
FIG. 3 is a diagram illustrating a page of a comic after a background region of the page of the comic has been identified, according to one embodiment.

FIG. 3 is a diagram illustrating a page 300 of a comic after a background region 302 of the page 300 of the comic has been identified (e.g., processed or grown), according to one embodiment. The page 300 may be one page in a comic (e.g., one or a plurality of pages in a comic). The page 300 includes seven actual panels (e.g., panels of the comic), panels 305, 310, 315, 320, 325, 330, and 335. The panels 305, 310, 315, 320, 325, 330, and 335 are shaded to indicate that the pixels which constitute the panels 305, 310, 315, 320, 325, 330, and 335 are not part of the background region 302 (which is not shaded in FIG. 3).

In one embodiment, a panel view module (e.g., panel view module 127 shown in FIG. 1) may obtain a background color from a user (e.g., via a user input indicating a background color value). In another embodiment, the panel view module may obtain the average pixel color value of a plurality of pixels within the background sample region 303 and may use the average pixel color as the background color. Although the background sample region 303 is shown at the top of the page 300, in other embodiments, the background sample region may be located in other areas of the page 300 (e.g., along the left or right side of the page 300, along the bottom of the page 300). In addition, multiple background sample regions on the page 300 may be used (e.g., a sample region on the top of the page 300 and a sample region on the left side of the page 300). In further embodiments, background sample regions from multiple pages of the comic may be analyzed to determine the background color.

After determining the background color, the background region 302 may be grown (e.g., all of the pixels in the page 300 are processed to determine whether the pixels are part of the background region). As discussed above, a pixel in the page 300 may be identified as part of the background region 302 if the color value of the pixel is within a threshold of the background color. In one embodiment the background region 302 may be grown starting from the sides or corners of the page 300. For example, the panel view module may begin analyzing pixels starting from the left, right, top, or bottom edges of the page 300 and continue analyzing pixels going towards the middle of the page 300.

Figure 4:
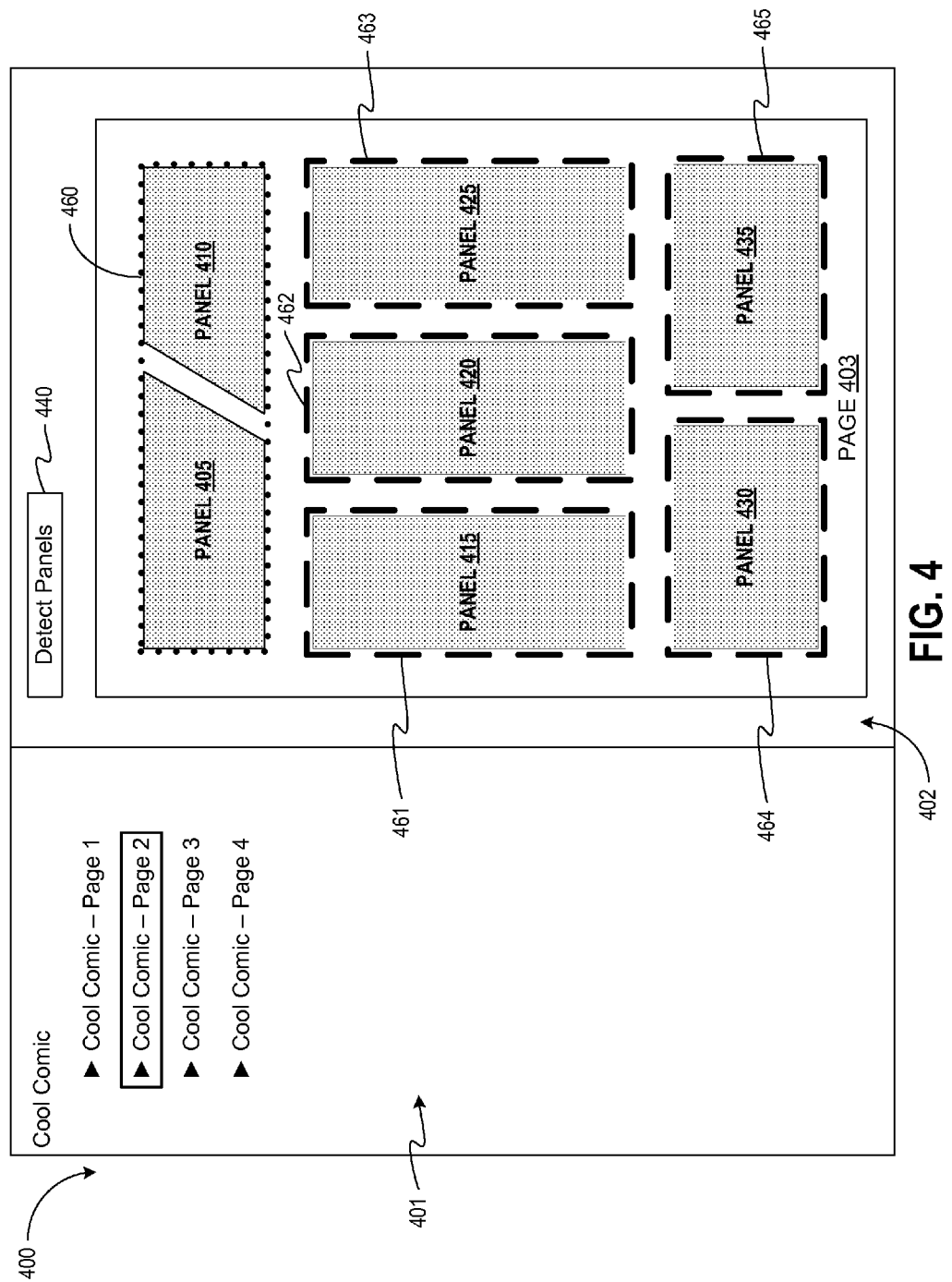
FIG. 4 is a diagram illustrating a graphical user interface (GUI) including a page of a comic and candidate comic panels on the page of the comic, according to one embodiment.

FIG. 4 is a diagramming illustrating graphical user interface (GUI) 400 of a page 403 of a comic (e.g., "Cool Comic") and candidate comic panels 460, 461, 462, 463, 464, and 465 on the page 403 of the comic, according to one embodiment. The GUI 400 includes a page listing section 401 which includes the pages in the comic. As shown in FIG. 4, the comic "Cool Comic" includes pages 1 through 4. The GUI 400 also includes a page display section 402, which displays a selected page of the comic. As shown in FIG. 4, page 2 of "Cool Comic" has been selected and the selected page is displayed in the display section 402 as page 403. The page 403 includes actual comic panels 405, 410, 415, 420, 425, 430, and 435.

The GUI 400 also includes a button 440 labeled "Detect Panels." A user may click, select, or activate the button 440 which may cause a panel view module (e.g., panel view module 127 of FIG. 1) to analyze a page of a comic. In one embodiment, the button 440 may cause the panel view module to analyze multiple pages of the comic. The panel view module may obtain a background color and identify candidate comic panels (e.g., candidate comic panels 460, 461, 462, 463, 464, and 465), as discussed above. After the panel view module identifies the candidate comic panels 460, 461, 462, 463, 464, and 465, the panel view module may determine a confidence level for each of the candidate comic panels 460, 461, 462, 463, 464, and 465. Candidate comic panels 461, 462, 463, 464, and 465 may have a confidence level greater than or equal to a threshold value, and are outlined using a dashed line (to indicate that the confidence level is greater than or equal to the threshold value). Candidate comic panel 460 may have a confidence level less than the threshold value and is outlined using a dotted line (to indicate that the confidence level is less than the threshold value). As shown in FIG. 4, the candidate comic panel 460 may not correctly identify the comic panels 405 and 410, because the panel view module has included both comic panels 405 and 410 into the candidate comic panel 460 instead of creating two separate candidate comic panels.

Figure 5:
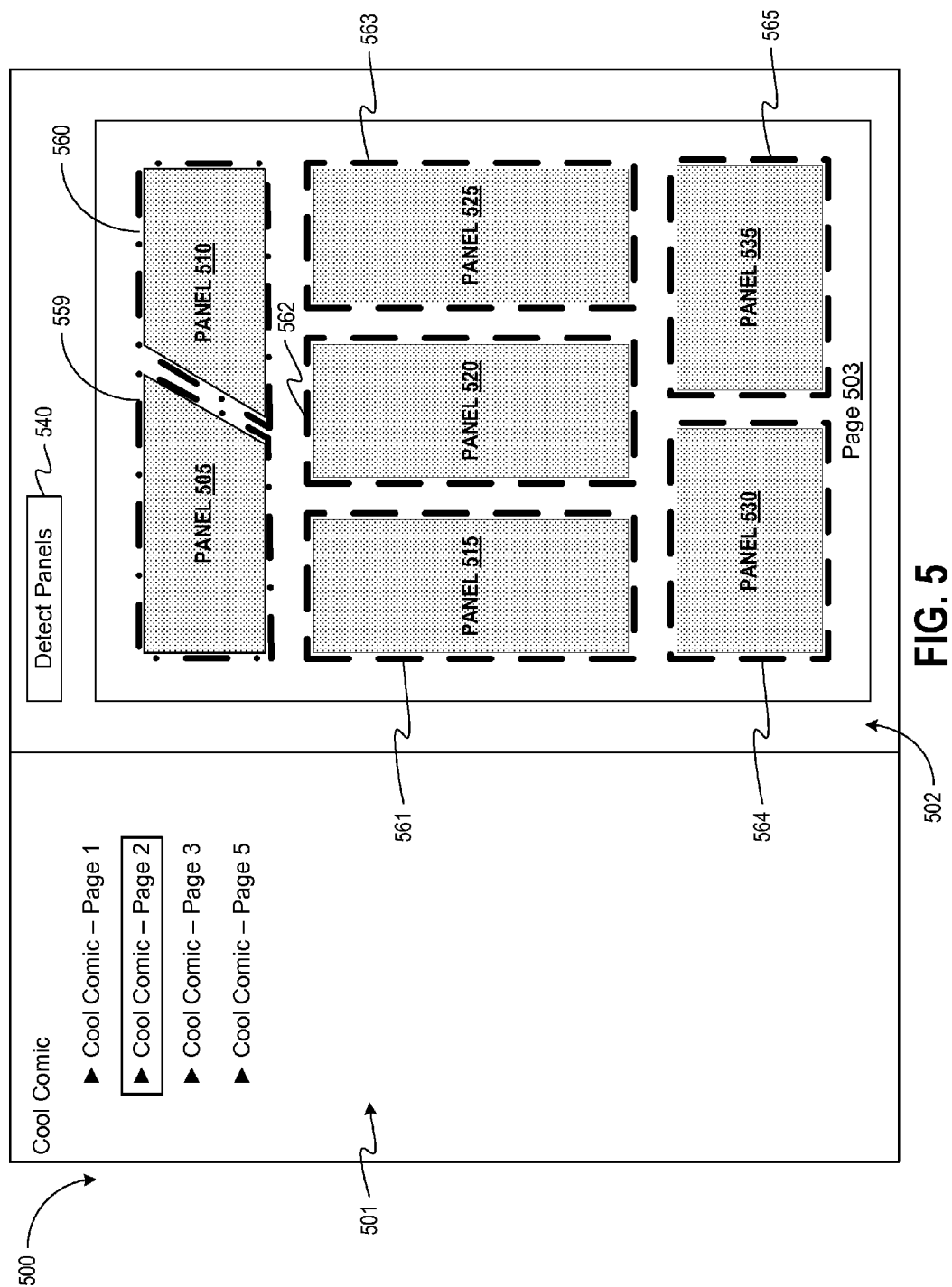
FIG. 5 is a diagram illustrating a graphical user interface (GUI) including a page of a comic and candidate comic panels on the page of the comic, according to another embodiment.

FIG. 5 is a diagramming illustrating graphical user interface (GUI) 500 including a page of a comic 503 and candidate comic panels 559, 560, 561, 562, 563, 564, and 565 on the page of the comic, according to another embodiment. The GUI 500 includes a page listing section 501 which includes the pages in the comic. As shown in FIG. 5, the comic "Cool Comic" includes pages 1 through 4. The GUI 500 also includes a page display section 502, which displays a selected page of the comic. As shown in FIG. 5, page 2 of "Cool Comic" has been selected and the selected page is displayed in the display section 502 as page 503. The page 503 includes actual comic panels 505, 510, 515, 520, 525, 530, and 535. The GUI 500 also includes a button 540 labeled "Detect Panels." A user may click, select, or activate the button 440 which may cause a panel view module (e.g., panel view module 127 of FIG. 1) to analyze one or more pages of a comic.

As discussed above in conjunction with FIG. 4, the candidate comic panel 460 may not correctly identify actual comic panels 405 and 410. A user may provide user input via the GUI 500 (e.g., user input via one or more of a mouse, keyboard, touch pad, touch screen, stylus, etc.) to modify or add candidate comic panels to correctly identify comic panels 505 and 510. As shown in FIG. 5, user input is received indicating that candidate comic panel 560 is modified (when compared to candidate comic panel 460 shown in FIG. 4) and user input is received indicating that candidate comic panel 559 should be added. Candidate comic panels 559 and 560 are outlined in dotted and dashed lines to indicate that the candidate comic panels 559 and 560 were added, modified, or corrected by a user (e.g., via user input).

Figure 6:
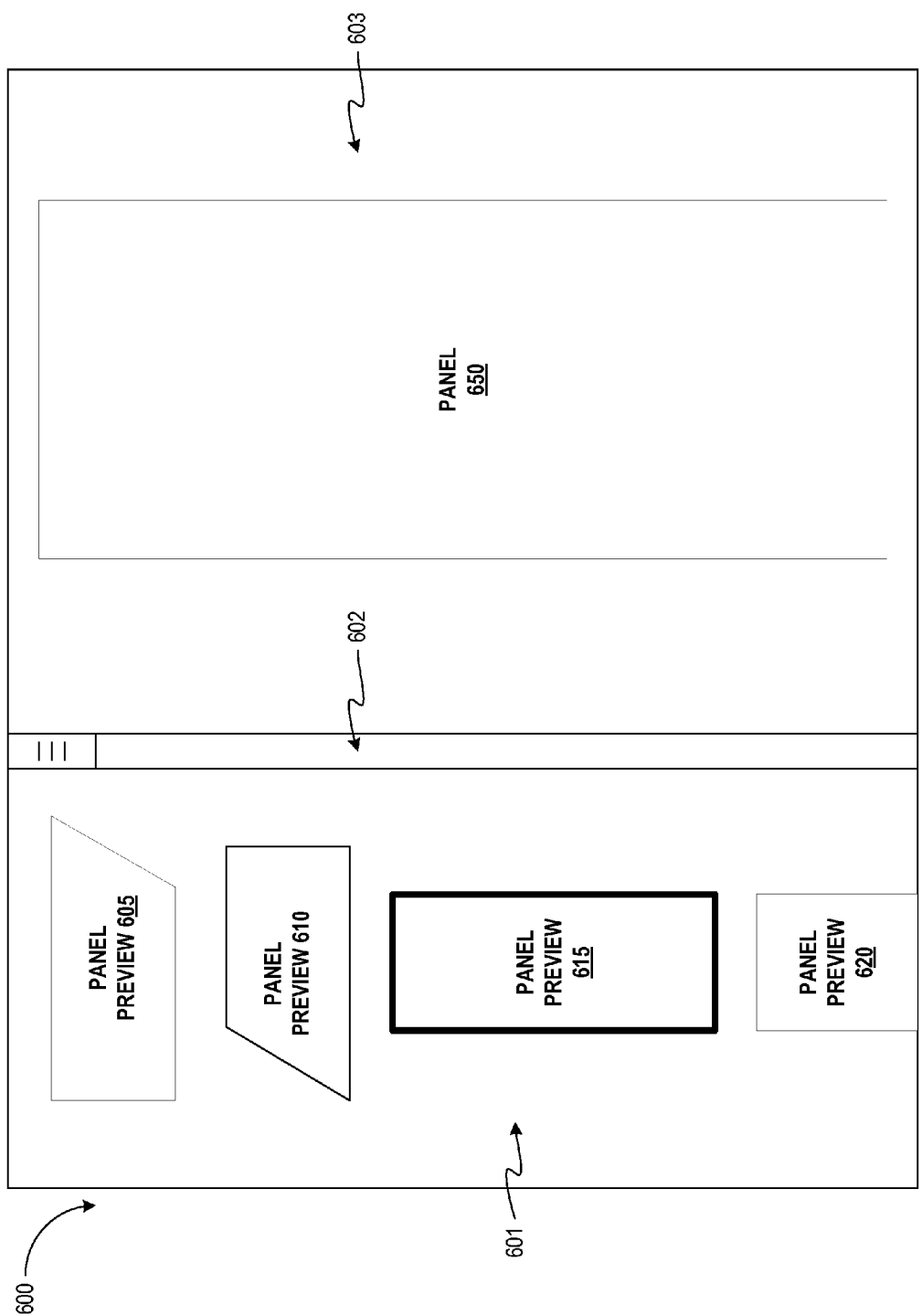
FIG. 6 is a diagram illustrating a graphical user interface (GUI) which includes a panel view of a comic, according to one embodiment.

FIG. 6 is a diagram illustrating a graphic user interface (GUI) 600 which includes a panel view 601 of a comic, according to one embodiment. The GUI 600 may be displayed to a user on a display (e.g., a monitor, a liquid crystal display (LCD), a touch screen, etc.) on a user device (e.g., user devices 102 and 104 of FIG. 1). The panel view 601 may be generated by a panel view module (e.g., panel view module 127 of FIG. 1). The GUI 600 also includes a scroll bar 602 and a panel display region 603. In one embodiment, the GUI 600 and the panel view 601 may allow a user to browse through or navigate through a comic on a per panel basis.

The panel view of the comic includes one or more panel previews (e.g., panel previews 605, 610, 615, and 620). The panel previews 605, 610, 615, and 620 may be thumbnails, previews, or reduced versions of actual comic panels in a comic. The panel previews 605 610, 615, and 620 allow a user to preview or browse the panels which are in a comic. The user may also view the panel previews by scrolling through the panel view 601 using the scroll bar 602. The user may select one of the panel previews and an enlarged version of the selected panel preview (e.g., the actual comic panel) may be displayed in the panel display region 603. As shown in FIG. 6, the panel preview 615 is selected and the panel 650 (which may be an enlarged version of panel preview 615 or the actual comic panel) is displayed in the panel display region 603.

In one embodiment, the panel view portion 601 may not be a separate portion of the GUI 600, but instead, may be part of the panel display region 603. Instead of displaying a list of panel previews (as shown in panel view 601), the panel preview may display a single panel at a time (e.g., as shown in the panel display region 603). A user may provide user input (e.g., a swipe gesture on a touch screen or a next button on a keyboard) to move from one panel to the next panel.

Figure 10:
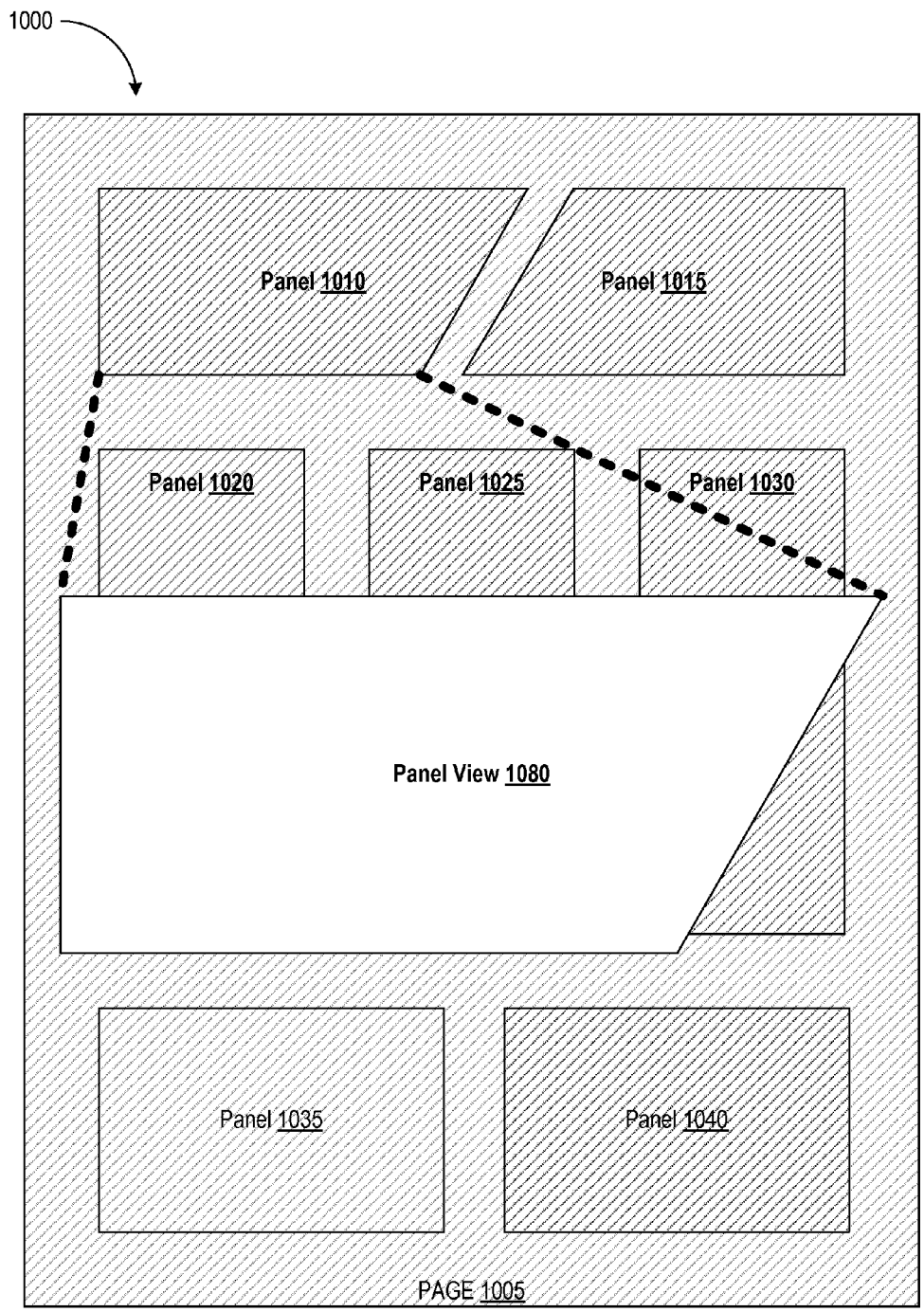
FIG. 10 is a diagram illustrating a graphical user interface (GUI) which includes a panel view of a comic, according to another embodiment.

FIG. 10 is a diagram illustrating a graphic user interface (GUI) 1000 which includes a panel view 1080 of a page 1005 of a comic, according to another embodiment. The GUI 1000 may be displayed to a user on a display (e.g., a monitor, a liquid crystal display (LCD), a touch screen, etc.) on a user device (e.g., user devices 102 and 104 of FIG. 1). The panel view 1080 may be generated by a panel view module (e.g., panel view module 127 of FIG. 1).

As shown in FIG. 10, the page 1005 includes comic panels 1010, 1015, 1020, 1025, 1030, 1035, and 1040. The panel view 1080 is an enlarged (e.g., blown up) view of panel 1010. A user may select a different comic panel (e.g., one of comic panels 1015, 1020, 1025, 1030, 1035, or 1040) and the panel view 1080 may be updated to enlarge the newly selected comic panel and display the newly selected panel in the panel view 1080. A user may select a different comic panel by select a particular panel (e.g., select comic panel 1025), by providing user input (e.g., a swipe gesture on a touch screen or pressing a next button on a keyboard) to process to the next comic panel (e.g., to progress from comic panel 1010 to comic panel 1015).

Figure 7:
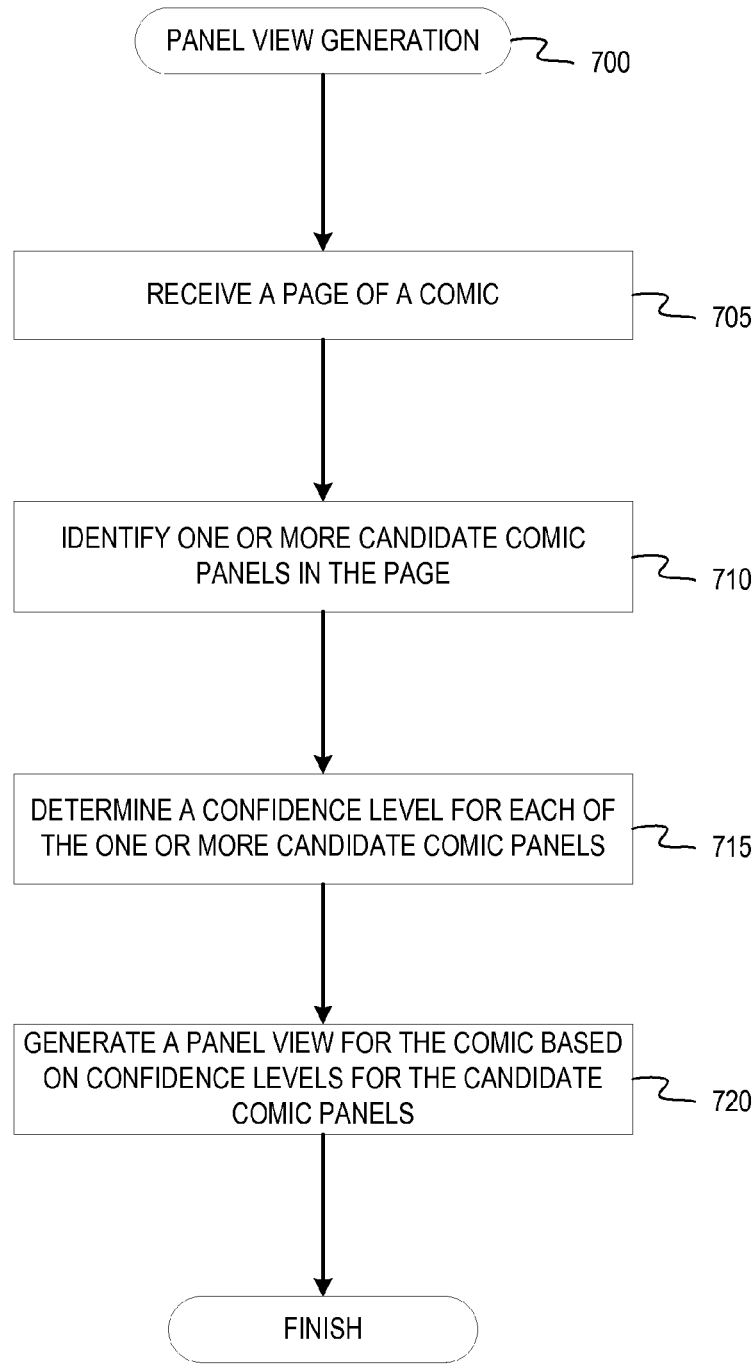
FIG. 7 is a flow diagram illustrating a method for generating a panel view for a comic, according to one embodiment.
Figure 8:
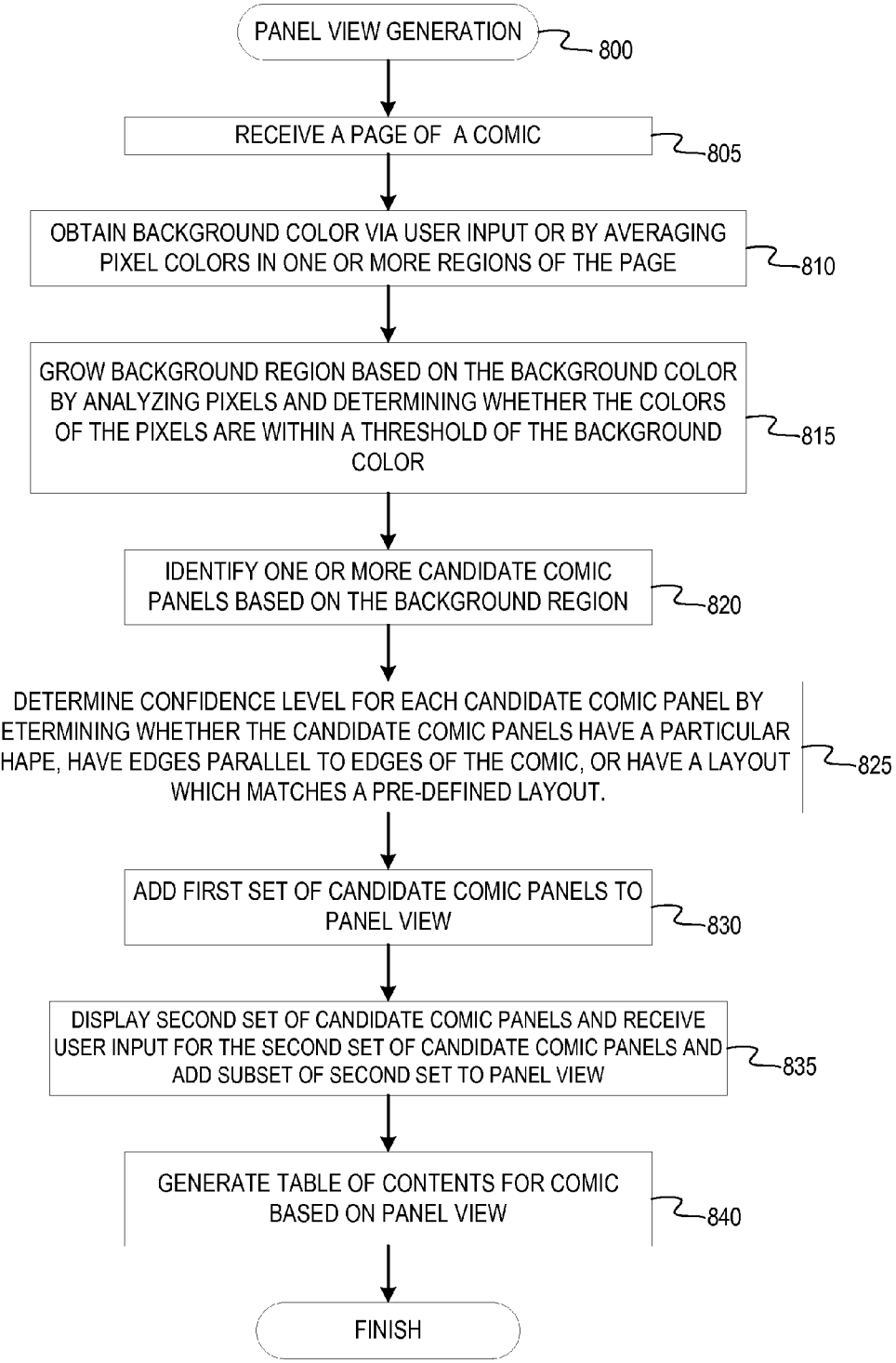
FIG. 8 is a flow diagram illustrating a method for generating a panel view for a comic, according to another embodiment.

FIGS. 7 and 8 are flow diagrams illustrating methods for generating a panel view for a media item (e.g., a comic). For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 7 is a flow diagram illustrating a method 700 for generating a panel view for a comic, according to one embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate a panel view for an electronic media item (e.g., for a comic). In one embodiment, method 700 may be performed by a panel view module, as shown in FIGS. 1 and 2.

Referring to FIG. 7, at block 705, method 700 begins by receiving a page of a comic (e.g., receiving a JPEG, a PDF, or an HTML page). At block 710, the method 700 may analyze the page of the comic (e.g., analyze the pixels of the page, as discussed above and below in conjunction with FIG. 8) to identify one or more candidate comic panels in the page. At block 715, the method 700 determines a confidence level for each of the one or more candidate comic panels (as discussed above and below in conjunction with FIG. 8). At block 720, the method 700 generates a panel view for the comic based on the confidence levels for the candidate comic panels (as discussed above and below in conjunction with FIG. 8).

In other embodiments, the method 700 may be performed on multiple pages of the comic, instead of on a single page of the comic. In one embodiment, method 700 may be performed separately one each of the multiple pages of the comic. In another embodiment, the method 700 may be performed for the multiple pages of the comic simultaneously. For example, the method 700 may receive multiple pages, may identify candidate comic panels in the multiple pages, may determine confidence levels for the candidate comic panels and may generate the panel view after processing the multiple pages.

FIG. 8 is a flow diagram illustrating a method for generating a panel view for a comic, according to another embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to generate panel view for an electronic media item (e.g., for a comic). In one embodiment, method 800 may be performed by a panel view module, as shown in FIGS. 1 and 2.

Referring to FIG. 8, at block 805, method 800 begins by receiving a page of a comic (e.g., receiving a JPEG or and HTML page). At block 810, the method 800 obtains a background color by receiving a user input indicating the background color, or by averaging color values in one or more regions of the page (e.g., a top region, a border region, etc.). At block 815, the method 800 grows the background region of the page by analyzing the pixels in the page and determining whether the color values of the pixels are within a certain threshold of the background color. As discussed above, in one embodiment the method 800 may grow the background region by processing pixels starting from the outer edges of the page and moving towards the center of the page. At block 820, the method 800 identifies one or more candidate comic panels based on the background region. For example, the method 800 may use morphology techniques on the page to identify the one or more candidate comic panels.

At block 825, the method 800 determines a confidence level for each of the one or more candidate comic panels. For example, the method 800 may determine a confidence level for a candidate comic panel based on the size and shape of the candidate comic panel. In another example, the method 800 may determine a confidence level for a candidate comic panel based whether the candidate comic panel has one or more edges parallel to one or edges of the page. In a further example, the method 800 may determine a confidence levels for candidate comic panels based on whether a layout of the candidate comic panels matches a pre-defined or known layout (e.g., matches another layout of a known comic page).

At block 830, the method 800 adds or includes a first set of candidate comic panels which have confidence levels higher than or equal to a threshold level, to the panel view. At block 835, the method 800 displays a second set of candidate comic panels which have confidence levels lower than the threshold level to a user. Also at block 835, the method 800 may receive user input for the second set of candidate comic panels and may add a subset of the second set of candidate comic panels to the panel view, based on the user input. For example, the method 800 may receive user input selecting one or more candidate comic panels in the second set of candidate comic panels and may add the selected candidate comic panels to the panel view. In another example, the method 800 may receive user input modifying or correcting a candidate comic panel, or adding a new candidate comic panel, and the method 800 may include the modified or new candidate comic panel in the panel view.

At block 840, the method 800 may generate a TOC for the comic based on the candidate comic panels in the panel view. For example, the method 800 may select candidate comic panels which meet certain criteria such as size, shape, and position, etc., and may use the candidate comic panels which meet the certain criteria to generate a TOC.

In other embodiments, the method 800 may be performed on multiple pages of the comic, instead of on a single page of the comic. In one embodiment, method 800 may be performed separately one each of the multiple pages of the comic. In another embodiment, the method 800 may be performed for the multiple pages of the comic simultaneously.

Figure 9:
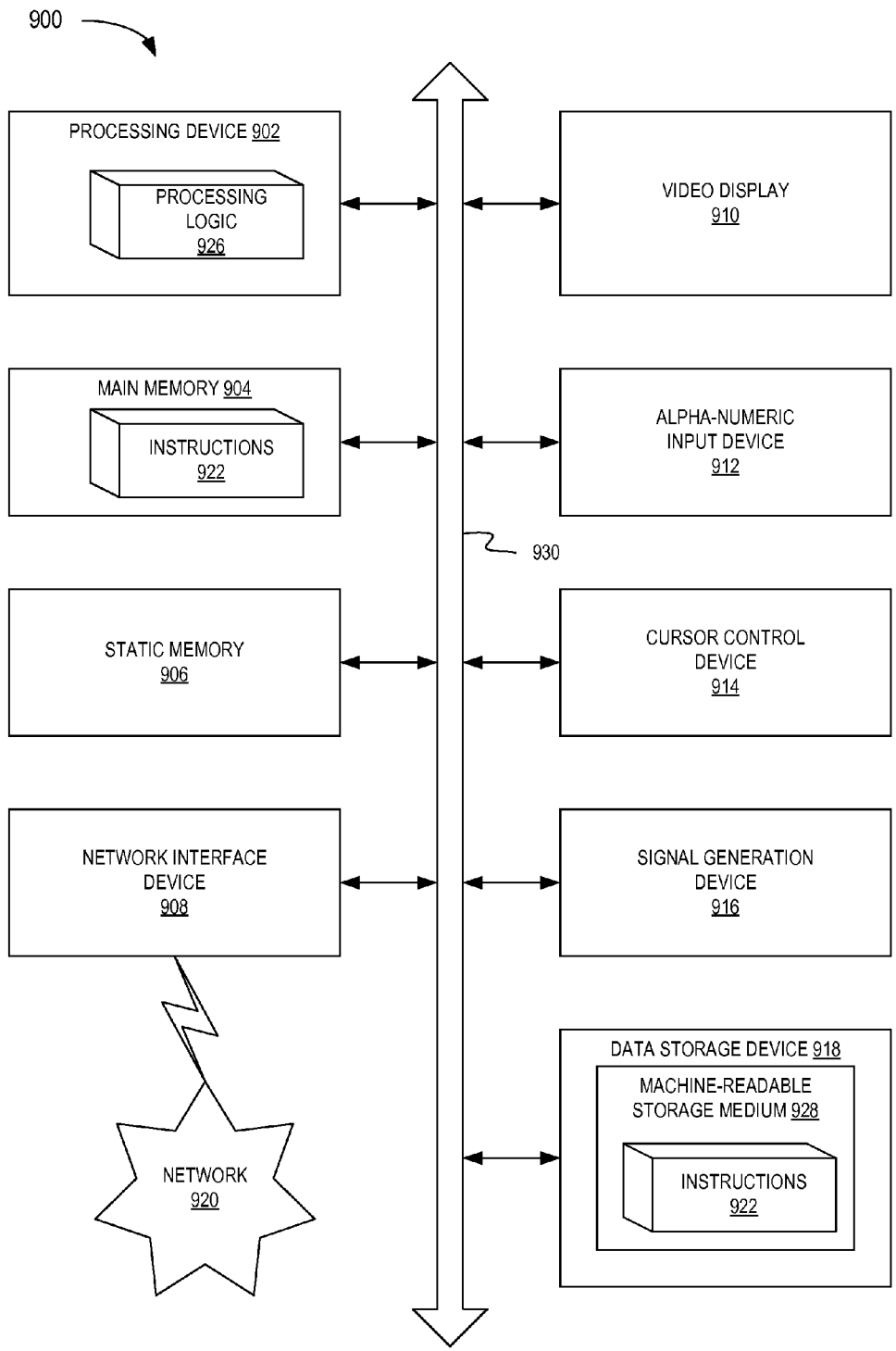
FIG. 9 is a block diagram illustrating one embodiment of a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the panel view module 127 for performing the operations and steps discussed herein.

The computer system 900 may further include a network interface device 908 which may communicate with a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse or a stylus), and a signal generation device 916 (e.g., a speaker). In one embodiment, the video display unit 910, the alphanumeric input device 912, and the cursor control device 914 may be combined in a single device (e.g., a touch screen or a touch pad)

The data storage device 918 may include a computer-readable medium 928 on which is stored one or more sets of instructions 922 (e.g., instructions of panel view module 127) embodying any one or more of the methodologies or functions described herein. The instructions 922 may also reside, completely or at least partially, within the main memory 904 and/or within processing logic 926 of the processor 902 during execution thereof by the computer system 900, the main memory 904 and the processor 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "obtaining," "growing," "identifying," "determining," "adding," "including," "averaging," "analyzing," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processing device, digital data representing a page of a comic book, the page including a plurality of comic panels set against a background region;
    determining, by the processing device, a background color of the page;
    identifying, by the processing device, values in the digital data as part of the background region of the page using the background color;
    identifying, by the processing device, a candidate comic panel from the plurality of comic panels using values in the digital data that are different from the values in the digital data that are part of the background region;
    determining, by the processing device, a confidence level for the candidate comic panel;
    adding, by the processing device, the candidate comic panel to a panel view as an actual comic panel when the confidence level is greater than a threshold, wherein the panel view is a digital representation of the comic book that allows panel by panel navigation of a set of actual comic panels;

identifying, by the processing device, another candidate comic panel from the plurality of comic panels as an actual comic panel using user input pertaining to at least one of size, shape, location, position or layout of a previously-identified panel, wherein the user input is received in response to the previously-identified panel having a confidence level that is not greater than the threshold;

creating, by the processing device, panel previews of reduced versions of the set of actual comic panels;

receiving, by the processing device, a request for the panel view;

sending, by the processing device, first data enabling a graphical user interface (GUI) to display at least some of the panel previews of the set of actual comic panels in a display region; and sending, by the processing device, second data enabling the GUI to display an enlarged version of a selected one of the panel previews in the same display region.

2. The method of claim 1, wherein determining the background color comprises receiving an indication of the background color from a user.

3. The method of claim 1, wherein the determining the background color comprises averaging color values in the digital data corresponding to one or more regions in one or more pages of the comic book.

4. The method of claim 1, wherein the identifying the values in the digital data as part of the background region comprises analyzing the values in the digital data of the comic book starting from a side of the page of the comic book.

5. The method of claim 1, wherein the identifying the values in the digital data as part of the background region comprises:

analyzing the values in the digital data of the comic book; and identifying one of the values as part of the background region if a color of the one value is within a threshold of the background color.

6. The method of claim 1, wherein the determining the confidence level for the candidate comic panel further comprises one or more of:

determining whether a boundary of the candidate comic panel comprises a geometric shape;

determining whether an edge of the boundary of the candidate comic panel is parallel to an edge of the page of the comic;

analyzing previously received user input associated with previously identified comic panels; or determining whether a layout of the candidate comic panel matches a pre-defined layout.

7. The method of claim 1, further comprising generating a table of contents for the comic using at least some of the set of actual comic panels in the panel view.

8. The method of claim 1, wherein the panel view comprises a navigation mechanism that is a guide for the comic book.

9. A system comprising:

a memory; and a processing device operatively coupled to the memory, the processing device configured to:

receive digital data representing a page of a publication, the page including panels set against a background region;

identify a plurality of potential panels in the page of the publication;

determine a first confidence level for a first potential panel of the plurality of potential panels;

add the first potential panel to a panel view for the publication, wherein the first confidence level automatically identifies the first potential panel as an actual panel of the publication, wherein the panel view is a digital representation of the publication that allows panel by panel navigation of a set of actual panels of the publication;

determine a second confidence level for a second potential panel of the plurality of potential panels;

receive user input to manually identify the second potential panel as an actual panel;

add the second potential panel to the set of actual panels in the panel view;

store the user input pertaining to at least one of size, shape, location, position or layout of a previously-identified panel to identify additional comic panels as actual comic panels of the publication;

determine a third confidence level for a third potential panel using the stored user input;

add the third potential panel to the panel view for the publication, wherein the third confidence level automatically identifies the third potential panel as an actual panel of the publication;

create panel previews of reduced versions of the set of actual panels;

receive a request for the panel view;

send first data enabling a graphical user interface (GUI) to display at least some of the panel previews of the set of actual panels in a display region; and send second data enabling the GUI to display an enlarged version of a selected one of the panel previews in the same display region.

10. The system of claim 9, wherein the processing device is further configured to: determine a background color of the page;

identify values in the digital data as part of the background region of the page using the background color; and identify the plurality of potential panels using values in the digital data that are different from the values in the digital data that are part of background region.

11. The system of claim 10, wherein the processing device is further configured to receive an indication of the background color from a user to determine the background color.

12. The system of claim 10, wherein the processing device is further configured to average color values in the digital data from a side region in at least one of the page of the publication or another page of the publication.

13. The system of claim 10, wherein the processing device is further configured to analyze the values in the digital data starting from a side of the page of the publication to identify the values in the digital data that are part of the background region.

14. The system of claim 10, wherein the processing device is further configured to: analyze the values in the digital data; and identify one of the values as part of the background region if a color of the one value is within a threshold of the background color.

15. The system of claim 9, wherein the processing device is further configured to:

determine whether a boundary of the first potential panel of the plurality of potential panels comprises a geometric shape;

determine whether an edge of the boundary of the first potential panel of the plurality of potential panels is parallel to an edge of the page of the publication;

analyzing previously received user input associated with previously identified panels; or determining whether a layout of the plurality of panels matches a pre-defined layout.

16. The system of claim 9, wherein the processing device is further configured to:

add a first set of additional panels of the publication that has a confidence level greater than a threshold to the set of actual panels in the panel view;

receive user input for a second set of additional panels of the publication that has a confidence level lower than the threshold; and add one of the second set of additional panels to the set of actual panels in the panel view in view of the user input.

17. The system of claim 9, wherein the processing device is further configured to generate a table of contents for the publication using at least some of the set of actual panels in the panel view.

18. The system of claim 9, wherein the panel view comprises a navigation mechanism that is a guide for the publication.

19. A non-transitory computer-readable storage medium storing instructions that, when executed, cause a processing device to perform operations comprising:

receiving, by the processing device, digital data representing a page of a publication;

identifying, by the processing device, a plurality of potential panels in the page of the publication;

determining, by the processing device, a first confidence level a first potential panel of the plurality of potential panels;

adding, by the processing device, the first potential panel to a panel view for the publication, wherein the panel view is a digital representation of the publication that allows panel by panel navigation of a set of actual panels, and wherein the first potential panel is automatically added to the set of actual panels in the panel view in view of the first confidence level;

determining a second confidence level for a second potential panel of the plurality of potential panels;

receiving user input to manually identify the second potential panel as one of the set of actual panels;

adding the second potential panel to the panel view for the publication;

storing the user input pertaining to at least one of size, shape, location, position or layout of a previously-identified panel to identify additional comic panels as actual comic panels of the publication;

determining a third confidence level for a third potential panel using the stored user input;

adding the third potential panel to the panel view for the publication, and wherein the third potential panel is automatically added to the set of actual panels in the panel view in view of the third confidence level;

receiving, by the processing device, a request for the panel view of the publication;

sending, by the processing device, first data enabling a graphical user interface (GUI) to display at least some panel previews of the set of actual panels in a display region, wherein the panel previews are reduced version of the set of actual panels; and sending, by the processing device, second data enabling the GUI to display an enlarged version of a selected one of the panel previews in the same display region.

20. The non-transitory computer-readable storage medium of claim 19, wherein the identifying the plurality of potential panels comprises:

determining a background color of the page;

identifying values in the digital data as part of a background region of the page using the background color; and identifying the plurality of potential panels using values in the digital data that are different from the values in the digital data that are part of the background region.

21. The non-transitory computer-readable storage medium of claim 20, wherein the determining the background color comprises receiving an indication of the background color from a user.

22. The non-transitory computer-readable storage medium of claim 20, wherein the determining the background color comprises averaging color values in the digital data corresponding to one or more side regions in one or more pages of the publication.

23. The non-transitory computer-readable storage medium of claim 20, wherein the identifying the values in the digital data as part of the background region comprises analyzing the values in the digital data starting from a side of the page of the publication.

24. The non-transitory computer-readable storage medium of claim 20, wherein the identifying the values in the digital data as part of the background region comprises:

analyzing the values in the digital data; and identifying one of the values as part of the background region if a color of the one value is within a threshold of the background color.

25. The non-transitory computer-readable storage medium of claim 19, wherein the determining the first confidence level for the first potential panel comprises one or more of:

determining whether a boundary of the first potential panel comprises a geometric shape;

determining whether an edge of the boundary of the first potential panel is parallel to an edge of the page of the publication; or analyzing previously received user input associated with previously identified panels.

26. The non-transitory computer-readable storage medium of claim 19, wherein the operations further comprises:

adding a first set of additional panels of the publication that has a confidence level greater than a threshold to the set of actual panels in the panel view;

receiving user input for a second set of additional panels of the publication that has a confidence level lower than the threshold; and adding one of the second set of additional panels to the set of actual panels in the panel view in view of the user input.

27. The non-transitory computer-readable storage medium of claim 19, wherein the operations further comprise generating a table of contents for the publication using at least some of the set of actual panels in the panel view.

28. The non-transitory computer-readable storage medium of claim 19 wherein the panel view comprises a guide for the publication.

* * * * *